United States Patent
Dobschal et al.

(10) Patent No.: US 10,831,040 B2
(45) Date of Patent: Nov. 10, 2020

(54) OPHTHALMOLOGICAL OPTICAL ELEMENT AND METHOD FOR CONSTRUCTING AN OPHTHALMOLOGICAL OPTICAL ELEMENT

(71) Applicant: tooz technologies GmbH, Aalen (DE)

(72) Inventors: Hans-Juergen Dobschal, Kleinromstedt (DE); Karsten Lindig, Erfurt (DE)

(73) Assignee: tooz technologies GmbH, Aalen (DE)

( * ) Notice: Subject to any disclaimer, the term of this patent is extended or adjusted under 35 U.S.C. 154(b) by 38 days.

(21) Appl. No.: 16/063,657

(22) PCT Filed: Dec. 9, 2016

(86) PCT No.: PCT/EP2016/080499
§ 371 (c)(1),
(2) Date: Jun. 18, 2018

(87) PCT Pub. No.: WO2017/102600
PCT Pub. Date: Jun. 22, 2017

(65) Prior Publication Data
US 2019/0004330 A1 Jan. 3, 2019

(30) Foreign Application Priority Data
Dec. 18, 2015 (DE) .................. 10 2015 122 302

(51) Int. Cl.
*G02C 7/02* (2006.01)
*G02B 27/42* (2006.01)
*G02B 27/01* (2006.01)

(52) U.S. Cl.
CPC ........... *G02C 7/02* (2013.01); *G02B 27/0172* (2013.01); *G02B 27/4211* (2013.01);
(Continued)

(58) Field of Classification Search
CPC ...... G02C 7/02; G02C 7/022; G02C 2202/22; G02B 27/0172; G02B 27/4211; G02B 2027/0178
(Continued)

(56) References Cited

U.S. PATENT DOCUMENTS 5,117,306 A   5/1992   Cohen
7,156,516 B2  1/2007   Morris et al.
(Continued)

FOREIGN PATENT DOCUMENTS

DE   102006061066 A1   6/2008
DE   102010047846 A1   4/2012
(Continued)

OTHER PUBLICATIONS

International Preliminary Report on Patentability rendered by the International Bureau of WIPO for PCT/EP2016/080499 dated Jun. 19, 2018, 7 pages.
(Continued)

*Primary Examiner* — Darryl J Collins
(74) *Attorney, Agent, or Firm* — Skaar Ulbrich Macari, P.A.

(57) ABSTRACT

An ophthalmological optical element, in particular a spectacle lens, includes a first refractive optical substrate, which has a positive or negative first optical power; a first diffractive optical element, which has a second optical power; and a second diffractive optical element, which has a third optical power. The first diffractive optical element and the second diffractive optical element have opposite optical powers. The first diffractive optical element and the second diffractive optical element interact in an at least partly achromatic manner.

20 Claims, 6 Drawing Sheets

(52) U.S. Cl.
CPC .. *G02B 27/4272* (2013.01); *G02B 2027/0178* (2013.01); *G02C 2202/20* (2013.01); *G02C 2202/22* (2013.01)

(58) Field of Classification Search
USPC .......................... 351/159.01, 159.44, 159.75
See application file for complete search history.

(56) References Cited

U.S. PATENT DOCUMENTS

| | | | |
|---|---|---|---|
| 9,176,329 B2 | 11/2015 | Kelch | |
| 9,417,461 B2 | 8/2016 | Kelch | |
| 9,989,768 B2 | 6/2018 | Lindig et al. | |
| 2002/0027712 A1* | 3/2002 | Soskind | G02B 5/1814 359/565 |
| 2003/0058538 A1* | 3/2003 | Sugiyama | G02B 5/18 359/570 |
| 2006/0050234 A1 | 3/2006 | Morris et al. | |
| 2008/0278681 A1 | 11/2008 | Blum et al. | |
| 2010/0045929 A1 | 2/2010 | Suzuki | |
| 2011/0109874 A1* | 5/2011 | Piers | A61F 2/1621 351/159.06 |
| 2017/0168301 A1* | 6/2017 | Chan | G02B 27/0172 |

FOREIGN PATENT DOCUMENTS

| | | |
|---|---|---|
| DE | 102012023025 A1 | 5/2014 |
| DE | 102014207500 B3 | 5/2015 |
| EP | 1072906 A2 | 1/2001 |

OTHER PUBLICATIONS

Office Action to the corresponding Chinese Patent Application No. 201680080935.2 rendered by the China National Intellectual Property Administration dated Jun. 19, 2019, 16 pages (including English translation).

* cited by examiner

OPHTHALMOLOGICAL OPTICAL ELEMENT AND METHOD FOR CONSTRUCTING AN OPHTHALMOLOGICAL OPTICAL ELEMENT

PRIORITY

This application claims the priority of German patent application DE 10 2015 122 302.3, filed Dec. 18, 2015, which is hereby incorporated herein by reference in its entirety.

FIELD

The present application relates to an ophthalmological optical element, in particular a spectacle lens, comprising a first refractive optical substrate and a first and a second diffractive optical element. Further, the present application relates, in particular, to a computer-implemented method for designing an ophthalmological optical element, a pair of spectacles and a head-mounted display apparatus (head-mounted display) having such an ophthalmological optical element.

BACKGROUND

Conventionally, prescription glasses have been produced according to methods tried and tested for decades. Here, a respectively necessary visual correction is set by selecting a front, object-side and a back, eye-side radius of curvature of the spectacle lens. For reasons of esthetics and production technology, the object-side outer radius is generally produced to be spherical, with it assuming a certain predetermined value that can be gathered from so-called preferred radii tables for a respective diopter range. The respective exact visual correction is then generated with the aid of the eye-side inner radius. In the simplest case, this may also be a spherical radius. Specific visual properties, such as astigmatism including the axis angle of the astigmatism or imaging properties for outer visual angles, for example, can likewise be realized by way of the inner radius. To this end, the outer radius is advantageously selected in such a way that the correction possibilities are not negatively influenced by the inner radius. By way of example, a relatively short outer radius should be selected in the case of strongly positive diopter values.

Depending on the number of diopters required, this can result in a spectacle lens that sags to a greater or lesser extent which, in the case of large diopter values, sometimes only offers a reduced esthetic appearance and poor comfort of wear. Particularly in the case of sports glasses with their desired tightly fitting form, the production of negative diopter values is only possible to a very restricted extent.

Further, it is known that a dioptric power can be produced by means of a diffractive optical element (DOE). Since diffractive optical elements have very strong dispersion in comparison with refractive optics, they can only be used very judiciously in terms of their power. Strong chromatic aberrations, in particular transverse chromatic aberrations at the field edge, which are no longer tolerable, arise at a power of from +/−2 dpt at the latest.

Chromatic aberrations firstly include the longitudinal chromatic aberration, which produces different focuses for different wavelengths. The longitudinal chromatic aberration is also referred to as axial aberration. In addition to the longitudinal chromatic aberration, a transverse chromatic aberration may occur as a further chromatic aberration, said transverse chromatic aberration being expressed by way of color fringes or color edges in the image plane, on the retina of the eye in the case of a visual aid, which the user perceives and considers to be bothersome above a certain strength. The transverse chromatic aberration is also referred to as color magnification error or lateral chromatic aberration.

Document US 2006/0050234 A1 discloses a diffractive lens for correcting visual defects. The lens has a combination of a first diffractive optical element (WSD) and a second diffractive optical element (MOD). Here, the second diffractive element provides the basic power or the predominantly focusing effect of the lens. The first diffractive element only provides an additive near-region correction.

In document US 2006/0050234 A1, the second refractive element is a so-called multi-order diffractive (MOD) lens, which supplies light of a plurality of different wavelengths from different orders of diffraction to a common focal distance. By way of example, green light ($\lambda_g$=550 nm) from the fifth order of diffraction and blue light ($\lambda_b$=471 nm) from the seventh order of diffraction are supplied to the same focal distance. Such an MOD structure is also referred to as polychromatic diffractive lens.

In addition to the basic power of the second diffractive element (MOD), the first diffractive element (WSD) provides an additive focusing effect for the near-region correction. To this end, light from different orders of diffraction is simultaneously supplied to two or more different focal distances. Here, the first optical element is referred to as "wavefront splitting diffractive structure" (WSD). It is also true here that only a restricted diffractive power can be added in order to keep the chromatic aberration within limits.

The first diffractive element and the second diffractive element of document US 2006/0050234 A1 cooperate in combination to the effect of the MOD providing a basic power and the WSD producing a multi-focal effect. As a result of the WSD having a much lower optical power than the MOD, chromatic aberrations caused by the first diffractive element (WSD) are kept within limits. By contrast, a mutual compensation of a chromatic aberration has not been disclosed.

However, a disadvantage of this approach lies in the fact that a chromatic aberration, in particular a transverse chromatic aberration, continues to be present. Further, in contrast to progressive addition lenses, a plurality of focal distances are provided simultaneously and not in a spatially separated manner on the spectacle lens by means of the WSD; this is only desired to a limited extent.

SUMMARY

The invention is therefore based on the object of providing an improved ophthalmological optical element, an improved pair of spectacles and head-mounted display apparatus comprising such an ophthalmological optical element, an improved computer-implemented method for designing an ophthalmological optical element, an improved method for producing an ophthalmological optical element, and of providing a corresponding computer program product, which all at least partly overcome the above-described disadvantages of conventional prescription glasses and the prior art.

Therefore, according to one aspect of the disclosure, the provision of an ophthalmological optical element is suggested, said ophthalmological optical element comprising a first refractive optical substrate, which has a positive or negative first optical power;

a first diffractive optical element, which has a second optical power;

a second diffractive optical element, which has a third optical power;

wherein the first diffractive optical element and the second diffractive optical element have opposite optical powers. In particular, the first diffractive optical element and the second diffractive optical element interact in an at least partly achromatic manner. In particular, the first diffractive optical element and the second diffractive optical element can interact in an achromatic manner together with the first refractive optical element.

In particular, the dioptric power of the ophthalmological optical element emerges from the sum of the first, second and third optical power. Since the first diffractive optical element (DOE) and the second diffractive optical element have opposite optical powers or optical powers with a different sign, the contributions of the second and the third optical power at least partly cancel one another. The inventors have recognized that, surprisingly, a reduction in the transverse chromatic aberration, which, in particular, may be even smaller than in the case of conventional refractive spectacle lenses optimized in a conventional manner, can be achieved by combining the two diametric DOEs or DOEs with opposite optical powers. Thus, a respective diopter demand can be satisfied and, at the same time, a good optical performance can also be achieved the image field edge by the corresponding use of two DOEs with opposite optical powers.

Preferably, the first diffractive optical element and the second diffractive optical element have an optical power that is approximately the same in terms of absolute value. The absolute value of the sum of the second optical power of the first diffractive optical element and of the third optical power of the second diffractive optical element divided by an absolute value of the difference between the second optical power and the third optical power can be less than $\frac{1}{10}$, in particular less than $\frac{1}{15}$, in particular less than $\frac{1}{20}$, $$K = \frac{|D2+D3|}{|D2-D3|} \leq x \text{ with } x \leq \frac{1}{10},$$

in particular $$x \leq \frac{1}{15},$$

in particular $$x \leq \frac{1}{20},$$

where D2 denotes the second optical power and D3 denotes the third optical power. Since D2 and D3 have opposite signs, the absolute value of the sum |D2+D3| is less than the absolute value of the difference |D2−D3|. The quotient specified in equation (1) can also be referred to as contrast or contrast value K.

According to a development of the first aspect of the disclosure, the provision of an ophthalmological optical element is suggested, said ophthalmological optical element comprising a first refractive optical substrate, which has a positive or negative first optical power;

a first diffractive optical element, which has a second optical power;

a second diffractive optical element, which has a third optical power;

wherein the first diffractive optical element and the second diffractive optical element have opposite optical powers, wherein the absolute value of the sum of the second optical power of the first diffractive optical element and of the third optical power of the second diffractive optical element divided by an absolute value of the difference between the second optical power and the third optical power is less than $\frac{1}{10}$, in particular less than $\frac{1}{15}$, in particular less than $\frac{1}{20}$.

Thus, counter to the usual endeavors of a person skilled in the art to select the optical power of a DOE as small as possible on account of the usually strong chromatic aberration of DOEs, the provision of two DOEs with relatively high optical powers and opposite signs is thus proposed. In particular, the resultant optical power emerges from the sum of the second and third optical power. The inventors have recognized that an advantageous mutual compensation of chromatic aberrations, including transverse chromatic aberrations, can be achieved by virtue of the first and second DOE having approximately the same optical power in terms of absolute value, as defined by the specifications provided above. Consequently, the first DOE the second DOE can interact in an at least partly achromatic manner. The additional optical power emerging from the sum of the two DOEs may assume a very substantial component of the overall optical power. Typically, +/−3 dpt, for example, can be added here by the two DOEs. In comparison, if use is made of a single DOE, an optical power approximately 0.1 to 0.3 dpt only can be typically added because the chromatic aberrations otherwise increase too strongly.

A further advantage of the proposed solution can consist of it only being necessary to store a few first optical substrates. Preferably, only one or two optical substrates with positive and negative refractive power are required in each case. A more in-depth adaptation to the visual acuity of the user can be undertaken by the first and second DOE.

A further advantage of the proposed solution can consist of it being possible to obtain an esthetic spectacle lens form, even in the case of high positive or negative diopter values.

A correction going beyond the optical power of the first refractive optical substrate can be effected by means of the DOEs. Preferably, no lenses with high central or edge thicknesses are consequently required, as a result of which it is also possible to obtain a reduction in materials and weight.

A further advantage of the proposed solution can consist of virtually arbitrary optical powers being obtainable since the DOE effect can be based on mathematically general xy-DOEs.

A further advantage of the proposed solution can consist of also being able to realize progressive addition lens or multi-region functions, like in the case of bifocal spectacles, for example, without great outlay.

A further advantage of the proposed solution can consist of also being able to provide sports spectacles, or spectacles with a predetermined strong front curvature, with aberration corrections.

To the extent that nothing else is specified, the terminology used within the scope of the present application corresponds to the definitions of the DIN EN ISO 13666:1998-11 standard by DIN Deutschen Institut für Normung e.V.

Within the scope of the present disclosure, an "ophthalmological optical element" can be understood to mean an optical element which serves to correct refractive errors, i.e., in particular, a pair of spectacles or a spectacle lens, a contact lens or else an intraocular implant or the like. In respect of the materials, a spectacle lens, for example, comprises not only inorganic or mineral glass but also organic material or plastics.

The optical power is understood to be the inverse of the focal length f. The unit of optical power is the diopter: 1 dpt=1 $m^{-1}$. Expressed differently, the optical power can specify the dioptric power, in particular a focusing effect, of a refractive lens or of a diffractive optical element. The demanded power should occur at the design reference point which, in particular, may lie on the back surface of the respective element. A prism power may occur at a prism reference point, which may differ from the design reference point.

Within the meaning of the present disclosure, "interacting in an at least partly achromatic manner" or "interacting in an achromatic manner" is understood to mean that the chromatic aberration or the chromatic aberrations is or are not necessarily completely eliminated but is or are at least attenuated.

The term "optical axis" is understood to mean a straight line perpendicular to both optical surfaces of a spectacle lens and along which light passes through the spectacle lens undeviated; see number 4.8 of the DIN EN ISO 13666 standard.

Within the scope of the present application, a "cross-sectional plane" is understood to mean a cross section through the ophthalmological optical element that lies parallel to a provided principal viewing direction of a user through the optical element. The cross-sectional plane can be a meridian plane if the optical element has an optical axis. By way of example, if a spectacle lens has no optical axis, the cross-sectional plane can contain the geometric center according to number 5.5 of the DIN EN ISO 13666 standard, namely the point of intersection of the horizontal and vertical centerlines of the rectangular box, in relation to the form of the uncut spectacle lens. A "geometric central axis" then extends through the geometric center, parallel to a provided principal viewing direction through the optical element. Consequently, the cross-sectional plane can contain the visual point according to number 5.11 of the DIN EN ISO 13666 standard, namely the point of intersection of the fixation line with the back surface of the optical element.

According to a second aspect of the disclosure, a computer-implemented method for designing an ophthalmological optical element, in particular a spectacle lens, for a user is furthermore proposed, wherein the ophthalmological optical element has a first optical substrate, which has a positive or negative first optical power;

a first diffractive optical element, which has a second optical power; and a second diffractive optical element, which has a third optical power, wherein the first diffractive optical element and the second diffractive optical element have opposite optical powers;

wherein the method includes the following steps:

selecting the first optical substrate, which has a positive or negative first optical power, according to a diopter range to be corrected;

providing the first diffractive optical element, which has the second optical power, and the second diffractive optical element, which has the third optical power. In particular, the first diffractive optical element and the second diffractive optical element interact in an at least partly achromatic manner.

In this way, it is possible to design an ophthalmological optical element that has the above-described advantages. The selection of the first optical substrate, which has a first positive or negative optical power, can preferably be effected according to a diopter range to be corrected. Expressed differently, the first optical substrate can provide a base optical power for the range of diopter values of users to be corrected. By way of example, a first optical substrate can serve as a basis for a range of 0 to +4 dpt, for example, and an alternative first optical substrate can be selected for range of +4 to +8 dpt, for example. An adaptation of the resultant effect of the ophthalmological optical element to the diopter value of the user to be corrected in the respective range can then be effected by means of the first and second diffractive optical element.

Preferably, the first diffractive optical element and the second diffractive optical element are selected in such a way that they have an optical power that is approximately the same in terms of absolute value. Preferably, the first and second diffractive optical element are selected in such a way that an absolute value of the sum of the second optical power of the first diffractive optical element and of the third optical power of the second diffractive optical element divided by an absolute value of the difference between the second optical power and the third optical power is less than $\frac{1}{10}$, in particular less than $\frac{1}{15}$, in particular less than $\frac{1}{20}$.

According to a third aspect of the disclosure, a method for producing an ophthalmological optical element is furthermore proposed, said method comprising the steps of designing the ophthalmological optical element according to the second aspect of the disclosure and, furthermore, the step of producing the ophthalmological optical element.

In this way, it is possible to produce an ophthalmological optical element that has the above-described advantages.

According to a fourth aspect of the disclosure, a computer program product comprising program code is furthermore provided, said computer program product being designed to carry out a method according to the second aspect of the disclosure, or one of the embodiments thereof, when the computer program product is executed on a data processing system.

Consequently, the computer program product facilitates the above-described designing of an ophthalmological optical element and therefore has the same advantages.

According to a fifth aspect of the disclosure, a pair of spectacles comprising a frame and a first and a second spectacle lens is furthermore proposed, wherein the first and/or second spectacle lens is an ophthalmological optical element according to the first aspect of the disclosure or one of the developments thereof.

Consequently, the spectacles can have the above-described advantages. In particular, the spectacles can have a predetermined strong front curvature and nevertheless be provided with a refractive error correction. This is advantageous, in particular, in the case of tightly fitting spectacles such as sports spectacles.

In one embodiment of the ophthalmological optical element according to the first aspect of the disclosure, provision can be made for the first optical substrate to have a front surface and a back surface, wherein the first diffractive optical element is arranged on the side of the front surface and/or the second diffractive optical element is arranged on the side of the back surface.

Front surface or object-side surface should be understood to mean the surface of the first optically refractive substrate that, when the ophthalmological optical element is used as intended, faces away from the eye of the user. Back surface or eye-side surface should be understood to mean the surface of the first optically refractive substrate that, when the ophthalmological optical element is used as intended, faces toward the eye of the user. Instead of the terms front surface and back surface, it is also possible to use the terms first optically effective surface and second optically effective surface.

In one embodiment of the ophthalmological optical element according to the first aspect of the disclosure, provision can be made for the ophthalmological optical element to have a second optical substrate that has the first diffractive optical element and/or the second diffractive optical element.

In this way, the first refractive optical substrate can be used, preferably without change, for a multiplicity of users. As a result, manufacturing can be simplified and standardized.

In a development of this embodiment, the first optical substrate can have a front surface and a back surface, wherein the second optical substrate is arranged on the side of the front surface or the back surface of the first optical substrate.

Preferably, the second optical substrate is arranged on the back surface of the first optical substrate. Further, the second optical substrate preferably has the first and the second DOE. In this way, one or more standardized first refractive optical substrates can be used, which are then adapted or individualized for the user by selecting the DOEs on the second optical substrate.

In particular, the second optical substrate can have, or consist of, a film, a glass or a plastics shell. By way of example, the second optical substrate can be a film, which has the first and second DOE. Such a film can preferably be applied onto the back surface of the first refractive optical substrate. Here, the first optical substrate can impart the necessary mechanical stability to the arrangement. In particular, a film or plastics shell can be produced in a cost-effective manner. By virtue of the second optical substrate being arranged on the back surface of the first optical substrate, it can be protected from damage such as scratches.

A cemented layer or an air gap can be provided between the first optical substrate and the second optical substrate in an embodiment of the ophthalmological optical element. In general, a medium with a different refractive index can be situated between the first optical substrate and the second optical substrate.

Preferably, the first optical substrate and the second optical substrate can be cemented to one another. Within the scope of cementing, adjacent surfaces, a back surface of the first optical substrate and a front surface of the second optical substrate, for example, in the present case, are adhesively bonded by means of a thin transparent cement layer. By way of example, an artificial resin can be used to this end. Moreover, provision can be made, in principle, for the first optical substrate and the second optical substrate to be connected by contact bonding. This manner of production is also referred to as molecular adhesion. Here, the surfaces are connected to one another by molecular adhesive forces.

In an embodiment, the first and/or second diffractive optical element can be produced by laser-beam writing, stamping, holographic exposure and/or photolithography.

In this way, it is possible, in accordance with the requirements, to provide a cost-effective first and/or second DOE, for example by stamping. Alternatively, or additionally, complex DOEs can also be realized, for example by holographic exposure and/or photolithographic processes.

In an embodiment of the ophthalmological optical element, the first and/or second diffractive optical element can be rotationally symmetric with respect to an optical axis.

An advantage of this embodiment consists of a cost-effective production. The first and/or second DOE can be provided with a rotationally symmetric phase function and an optionally identical coordinate origin. Likewise, the DOEs can be embodied as holographic-optical elements (HOEs) in the case of a holographic exposure, said holographic-optical elements optionally being exposed in an axial symmetric manner and having the same origin. From a production technology point of view, HOEs can be exposed independently and successively, preferably on a correspondingly thin plastics shell, and then be adhesively bonded onto the first diffractive optical element. An attachment by means of spacer elements is also possible if an air gap is used instead of a cement layer, for example.

In an embodiment, the first and/or second DOE can be described in the cross-sectional plane by a second or higher order polynomial. In particular, a third or fourth order polynomial can be provided, for example. By way of example, a third order polynomial can be formed in the form of $P(y)=A|y|^3+B|y|^2+C|y|+D$, where A, B, C and D are constant.

The coefficients of the polynomials can be optimized by means of a ray tracing method. In principle, such ray tracing methods are known to a person of average skill in the art. By way of example, they described in "Robert R. Shannon, The Art and Science of Optical Design, Cambridge University Press, 1997". In this way, it is possible to initially design an ophthalmological optical element according to the second aspect of the present disclosure at least approximately, and to further optimize the design. Here, the step of optimization can be carried out significantly faster, in particular on account of the solutions that are at least approximately found at the outset. Moreover, this allows resources of a data processing system employed to this end to be saved.

Preferably, the first and second diffractive optical element (21, 22) can be each described by a phase polynomial of a second or higher order in a cross-sectional plane, wherein, with a tolerance range of ±20%, in particular ±10%, in particular ±5%, the following relationship applies between a first coefficient $a_{1,DOE1}$ of the phase polynomial of the first diffractive optical element and a first coefficient $a_{1,DOE2}$ of the phase polynomial of the second diffractive optical element:

$$\left|\frac{a_{1,DOE1}}{a_{1,DOE1}+a_{1DOE2}}\right|=\frac{20}{\sqrt{D}\sqrt{d}}, \tag{2}$$

where D specifies a resultant additional optical power by the first and second diffractive optical element, d specifies a distance between the first and second diffractive optical element. In accordance with the opposite signs of the second and third optical power of the first and second diffractive optical element, the coefficients $a_{1,DOE1}$ and $a_{1,DOE2}$ of the first and second diffractive optical element can have different signs. Further, likewise with the aforementioned tolerances, the following relationship may apply:

$$a_{1,DOE1} - a_{1DOE2} = \frac{D}{1000} \quad (3)$$

where $\lambda_0$ denotes a design wavelength of 546 nm, for example.

In an embodiment, the ophthalmological optical element further can have an astigmatic effect and/or differently focusing effect in the near and far part.

In general, an additional corrective effect can be provided, in particular an astigmatism correction and/or a progressive addition lens or near region correction. This effect can be obtained by the first refractive optical element and/or by the first and/or second DOE or any combination thereof. In particular, an additional corrective effect can advantageously be effected when producing a DOE by means of holographic exposure with deformed wavefronts, for example. Further, an astigmatism correction including the necessary axis angle can be provided, for example by introducing a cylindrical optical unit.

In an embodiment, the method according to the second aspect of the present disclosure the first optical substrate can be selected from a set of predetermined first optical substrates. Here, each of the predetermined optical substrates can act as a basis for a diopter range to be corrected. By way of example, the set of predetermined first optical substrates has at least one of the following diopter ranges: 0 . . . +5 dpt, 0 . . . −5 dpt, +5 . . . +8 dpt and −5 . . . 8 dpt.

An advantage of this configuration consists of it only being necessary to store a limited number of first optical substrates. This is particularly advantageous in the case of a head-mounted display apparatus according to the sixth aspect, as will still be explained in more detail below.

The grating frequencies that have to be achieved for ensuring the necessary optical functions are ever higher, the further a desired diopter number for a user lies away from a diopter number, selected at the outset, of the first refractive optical element. In order to avoid a spread that is too great, it may therefore be recommended to provide a set of predetermined optical substrates which each cover part of a larger range.

In a development of the embodiment, a substrate of the set of predetermined first optical substrates can act, for example, as a basis for a diopter range of at least 2, in particular at least 3, in particular at least 4 diopters. The diopter ranges can overlap one another.

According to a sixth aspect of the disclosure, a head-mounted display apparatus (head-mounted display or HMD) with an ophthalmological optical element according to the first aspect of the present disclosure is proposed, wherein the ophthalmological optical element further has an input coupling optical unit that, by means of the first optical substrate of the ophthalmological optical element, is embodied to input couple an image to be displayed.

A head-mounted display apparatus or a head-mounted display, abbreviated HMD, should be understood to mean a visual output appliance that is worn or wearable on the head. In particular, this can be a so-called OHMD, which allows the user to look through the display. Such apparatuses are particularly advantageous for applications in "augmented reality". In particular, an HMD can present images on a screen that is close to the eyes, or it projects said images directly onto the retina.

Preferably, the first optical substrate is embodied to guide, in the first optical substrate by way of total-internal reflection, light of the image to be displayed and it further has a combiner optical unit as an input coupling unit which, in the case of intended use, comes to rest in front of the eye.

A problem usually existing in the case of HMDs is that different diopter requirements in each case require a calculation of a new HMD input coupling optical unit or use of a combination with a normal spectacle lens of prescription spectacles. Hence, either much outlay is necessary or use is made of a sandwich-like construction, which would make the overall spectacles very thick.

According to the proposed solution, a standardized first refractive optical element having an HMD input coupling or output coupling optical unit can be used for an entire diopter range or for a portion thereof. An individualization can be brought about by virtue of a first and second DOE, as described above, being provided on the back surface of the first optical element. As a result, the DOEs act both on the transmitted light and mirrored-in channel such that the same HMD or the same first optical element can be used for a plurality of visual acuities. As a result, the production can be simplified and the costs can be reduced.

In one embodiment, the ophthalmological optical element can have an input coupling optical unit and/or output coupling optical unit for an HMD that, by means of the first optical substrate of the ophthalmological optical element, is embodied to input couple and/or output couple an image to be displayed.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

Embodiments of the invention are shown in the drawing and explained in more detail in the following description. In the figures.

Figure 1:
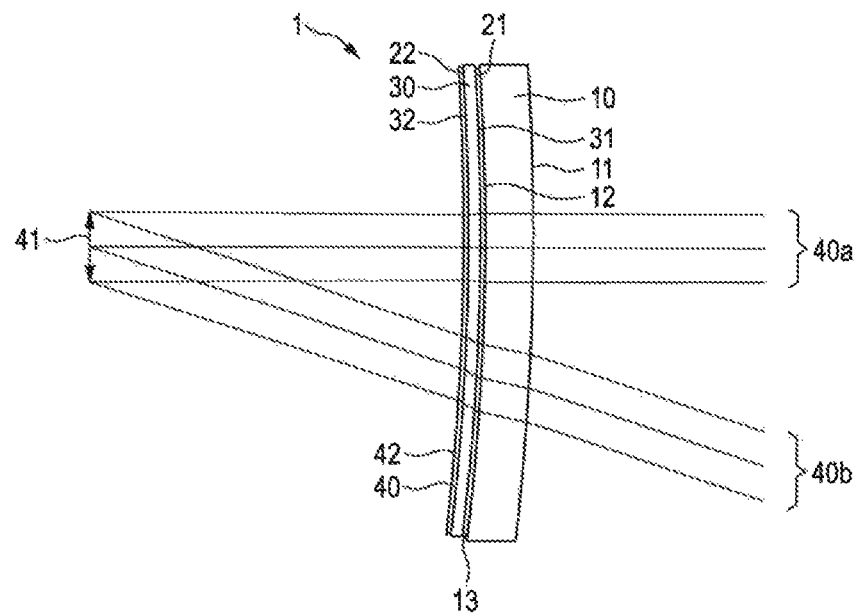
FIG. 1 shows a sectional illustration of an ophthalmological optical element according to a first embodiment.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 shows a sectional illustration of an ophthalmological optical element 1 according to a first embodiment, for example a spectacle lens. The ophthalmological optical element 1 has a first refractive optical substrate 10, which has a positive or negative first optical power, a first diffractive optical element (DOE) 21, which has a second optical power, and a second diffractive optical element 22, which has a third optical power, wherein the first diffractive optical element 21 and the second diffractive optical element 22 have opposite optical powers and wherein the first diffractive optical element 21 and the second diffractive optical element 22 interact in an at least partly achromatic manner. The first diffractive optical element 21 and the second diffractive optical element 22 can have approximately the same optical power in terms of absolute value, but with opposite signs, and so the first diffractive optical element 21 and the second diffractive optical element 22 interact in an at least partly achromatic manner.

FIG. 1 shows a preferred embodiment, in which an object-side front surface 11 of the first optical substrate 10 has a convex embodiment for esthetic reasons. Preferably and likewise for esthetic reasons, an eye-side back surface 12 of the first optical substrate 10 has a concave embodiment. The optical power of the first refractive optical substrate 10 emerges, in particular, from the radii of the front surface 11 and the back surface 12 and from a thickness of the substrate 10.

In the embodiment shown in FIG. 1, a second optical substrate 30 is arranged at the back surface 12 of the first optical substrate 10. Here, the second optical substrate 30 has the first diffractive optical element 21 at an object-side front surface 31 and the second diffractive optical element 22 at an eye-side back surface 32. Alternatively, the second diffractive optical element 22 can also be arranged at the rear surface 12 of the first optical substrate 10.

By way of example, the second optical substrate 30 can be a plastics shell or a film, for example a grating film with a front-side, first diffraction grating for the first diffractive optical element 21 and a back-side, second diffraction grating for the second diffractive optical element 22.

The second optical substrate 30 can be adhesively bonded or cemented to the first optical substrate 10. An attachment by means of spacer elements is also possible if an air gap is used instead of a cement layer, for example. To this end, an air gap or a cement layer 13 is situated between the back surface 12 of the first optical substrate 10 and the front surface 31 of the second optical substrate 30 in the example shown in FIG. 1. The air gap or the cement layer 13 can have a refractive index that differs from the first and/or second optical substrate 10, 30.

Optionally, a protective layer 40 can be provided on the back surface 32 of the second optical substrate 30, said protective layer protecting the second DOE 22, in particular, for example from mechanical damage. The protective layer 40 has a refractive index that differs from the second optical substrate 30. Optionally, a protective layer can be provided at the front surface 11 of the first optical substrate 10.

Further, FIG. 1 illustrates, in an exemplary manner, beams 40a, 40b that are incident from infinity, said beams being supplied to an entry pupil 41 of an eye of a user through the ophthalmological optical element 1.

In a specific exemplary embodiment, the first optical element 1 can be designed for a diopter range of 0 to −4 dpt, a pupil diameter of 3 mm and a visual field of +/−25 degrees. One or more of the front and/or back surfaces can have a spherical embodiment for cost-effective manufacturing. In this example, R1 denotes a radius of a back surface 42 of the protective layer 40, R2 denotes the radius of the back surface 32 of the second optical element 30, R3 denotes the radius of the front surface 31 of the second optical element, R4 denotes the radius of the back surface 12 of the first optical element 10 and R5 denotes the radius of the front surface 11 of the first optical element 10. In this example, D1 denotes the thickness of the protective layer 40, D2 denotes the thickness of the second optical element 30, D3 denotes the thickness of the cement layer 13 and D4 denotes the thickness of the first optical element 10. The values of the first optical element 1 according to this exemplary embodiment can be selected as follows:

R1=112.17 mm (cc) D1=0.1 mm
R2=112.27 mm (cc) D2=0.25 mm
R3=112.57 mm (cc) D3=0.1 mm
R4=112.67 mm (cc) D4=2.0 mm
R5=120.00 mm (cc)

Here, the specification "cc" refers to the fact that this may be a concave surface in each case. Appealing esthetics can be achieved therewith.

Figure 3:
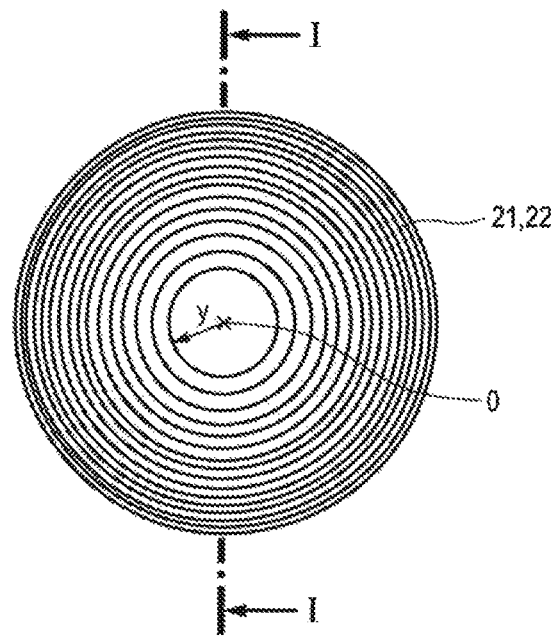
FIG. 3 shows a plan view of an ophthalmological optical element according to a further embodiment.

The first and/or second diffractive optical element 21, 22 can be provided with a rotationally symmetric phase function and an optionally identical coordinate origin. Such a structure is shown in an exemplary manner in the plan view in FIG. 3. The section I-I denotes the cross-sectional plane according to FIG. 1 in this case.

A sixth order phase polynomial can be selected for the first DOE 21 and for the second DOE 22 in this exemplary embodiment. In the present example, preferably only the even terms are taken into account, with:

$$P(y) := \sum_{i=1}^{N} \frac{a_i y^{2i}}{\lambda_H} \text{ with } i = 1...N \text{ and } N = 3, \quad (4)$$

where y denotes radial height on the DOE, i.e., a radial distance from the center (see 0 in FIG. 3) and $\lambda_H$ denotes a design wavelength, for example $\lambda_H$=546 nm in this case. The coefficients $a_i$ can be selected according to a desired diopter value. Optionally, the design wavelength $\lambda_H$ can already be contained in the coefficient $a_i$. In the sets of coefficients specified below in an exemplary manner, the design wavelength $\lambda_H$ is already contained in the coefficients $a_i$.

An advantage of this solution thus consists of, in particular, the same first refractive optical element 10 being able to serve as a basis for a plurality of desired diopter values for different users. As a result, the production of the first optical element can be standardized, as a result of which the production costs can be lowered. Fitting to a desired diopter value of a user can be effected by way of the selection of the coefficients $a_i$ of the phase polynomial of the first and second DOE 21, 22. The following sets of coefficients can be selected in the present example:

Set of Coefficients at −1 Dpt

| Coefficient | DOE1 | DOE2 |
| --- | --- | --- |
| a1 | −0.4274E−01 | 0.4363E−01 |
| a2 | −0.2732E−04 | 0.2791E−04 |
| a3 | 0.2187E−06 | −0.2270E−06 |

Set of Coefficients at −2 Dpt

| Coefficient | DOE1 | DOE2 |
| --- | --- | --- |
| a1 | 0.3751E−01 | −0.3616E−01 |
| a2 | −0.7081E−04 | 0.6560E−04 |
| a3 | 0.2261E−06 | −0.2001E−06 |

Set of Coefficients at −3 Dpt

| Coefficient | DOE1 | DOE2 |
| --- | --- | --- |
| a1 | 0.4882E−01 | −0.4671E−01 |
| a2 | −0.1107E−03 | 0.1015E−03 |
| a3 | 0.3310E−06 | −0.2871E−06 |

Set of Coefficients at −4 Dpt

| Coefficient | DOE1 | DOE2 |
| --- | --- | --- |
| a1 | 0.6123E−01 | −0.5808E−01 |
| a2 | −0.1668E−03 | 0.1512E−03 |
| a3 | 0.4874E−06 | −0.4139E−06 |

In the present example, the first optical substrate 10 and the second optical substrate 30 are produced from a first transparent material, polycarbonate in this case. The cement layer 13 and protective layer 40 are produced from a second transparent material, PMMA in this case, which has a different refractive index. Polycarbonate can have a refractive index $n_1=1.49$ and PMMA can have a refractive index $n_2=1.6$.

It is understood that the respective numerical values, i.e., radii of the respective surfaces and/or coefficients of the first and second DOE 21, 22, can be obtained in a computer-assisted manner by an optical simulation or optimization for a respectively desired diopter value and a desired geometry.

According to an aspect of the present disclosure, the first DOE 21 and the second DOE 22 are designed under the boundary condition that the absolute value of the sum of the second optical power of the first diffractive optical element 21 and of the third optical power of the second diffractive optical element 22 divided by an absolute value of the difference between the second optical power and the third optical power is less than 1/10, in particular less than 1/15, in particular less than 1/20. By virtue of the second and third optical power being selected to be approximately the same in terms of absolute value in this way and these having different signs, it is possible, in particular, to obtain a lower transverse chromatic aberration. This quotient also specified in equation (1) can be referred to as contrast or contrast value K.

Exemplary contrast values K are specified below for a diopter number D that is additionally to be corrected by the combination of the first and second DOE 21, 22 and for a distance between the first and second DOE d:

| D [dpt] | d [mm] | $K = \frac{|D2+D3|}{|D2-D3|}$ |
| --- | --- | --- |
| 1 | 0.5 | 54.7 |
| 1 | 1.0 | 38.9 |
| 1 | 1.5 | 31.8 |
| 2 | 0.5 | 38.5 |
| 2 | 1.0 | 27.4 |
| 2 | 1.5 | 22.5 |
| 3 | 0.5 | 31.3 |
| 3 | 1.0 | 22.3 |
| 3 | 1.5 | 18.3 |
| 4 | 0.5 | 26.9 |
| 4 | 1.0 | 19.2 |
| 4 | 1.5 | 15.8 |

In the case of the same diopter number, the contrast values at the different distances between the DOEs preferably behave proportionally to $\sqrt{d1/d2}$, where d1 and d2 specify the distances between the DOEs from one another. A distance between the DOEs can be defined as a distance between the DOEs along the optical axis.

As described at the outset, the grating frequencies that have to be reached by a diffractive optical element to ensure an optical effect, such as a desired optical power, are ever higher, the greater in terms of magnitude the desired additional effect is of the combination of the first and second DOE 21, 22. However, a high grating frequency and the small structure dimensions connected therewith can increase the requirements on the production. Therefore, it is recommended to subdivide a diopter range to be covered, for example from −8 dpt to +8 dpt, into a plurality of diopter ranges. By way of example, into the ranges of −8 dpt . . . −4 dpt, −4 dpt . . . 0 dpt, 0 dpt . . . +4 dpt, 4 dpt . . . 8 dpt. Then, final fitting to the value of the user can be brought about by means of the first and second DOE.

Figure 2:
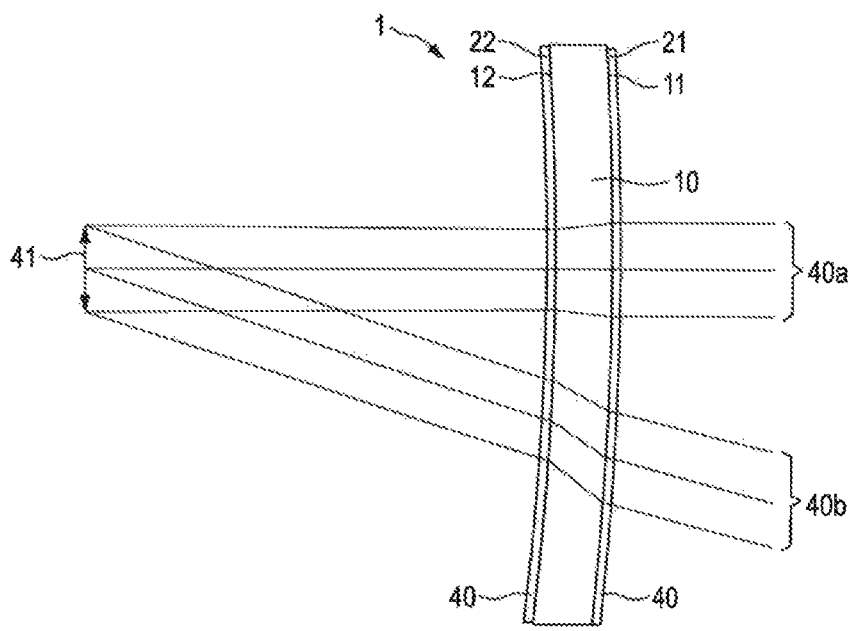
FIG. 2 shows a sectional illustration of an ophthalmological optical element according to a second embodiment.

FIG. 2 schematically shows a sectional illustration of a further possible embodiment of an ophthalmological optical element 1. Identical elements are identified, once again, by the same reference signs and will not be described again. Only the differences will be discussed below.

In the embodiment shown in FIG. 2, the first DOE 21 is arranged at an object-side front surface 11 of the first refractive optical substrate 10. The second DOE 22 can be arranged at an eye-side back surface 12 of the first refractive optical substrate 10. Preferably, provision can be made of a protective layer 40, which protects the first and/or second DOE 21, 22.

Figure 4:
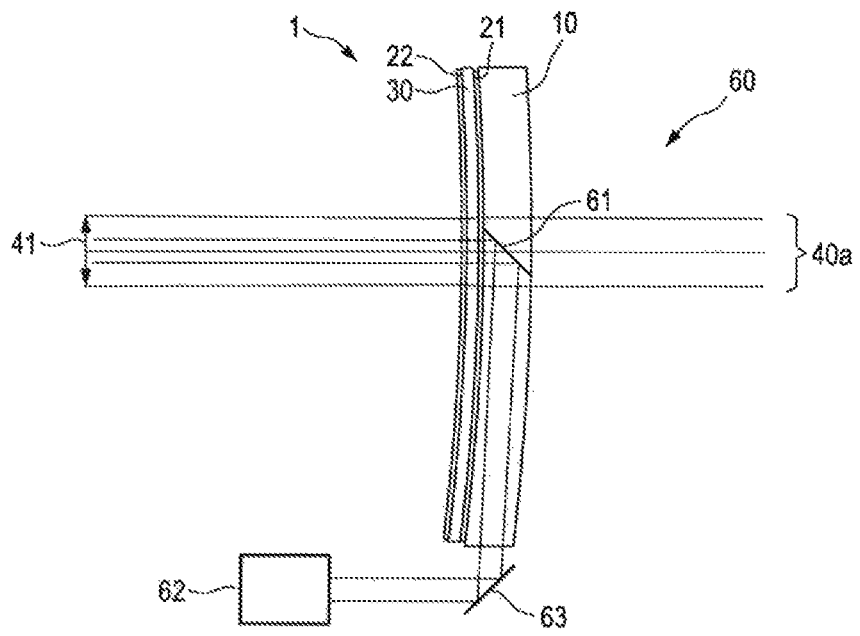
FIG. 4 shows a schematic illustration of a head-mounted display apparatus (HMD) comprising an ophthalmological optical element similar to the first embodiment of FIG. 1.

FIG. 4 shows a simplified schematic illustration of a head-mounted display apparatus (HMD) 60 with a development of an ophthalmological optical element 1 according to an aspect of the present disclosure, as described with reference to FIG. 1.

The ophthalmological optical element 1 further has an input coupling optical unit 61 that, by means of the first optical substrate 10 of the ophthalmological optical element 1, is embodied to input couple an image to be displayed.

Further, the HMD 60 has an image source 62, which provides an image to be displayed. The image to be displayed can be input coupled into the first optical substrate 10, optionally via a further element 63.

In the example shown in FIG. 4, the components of the HMD are illustrated in a very simplified manner. By way of example, the image to be displayed is input coupled from the image source 62 into the first optical substrate 10 via a first mirror 63 and output coupled from the optical substrate or input coupled into the beam path to the eye via a second mirror 61. Preferably, the mirror 61 can be a semitransparent mirror such that the user can also continue to perceive light 40a from their surroundings. This is particularly advantageous for applications in augmented reality.

Diffractive input coupling or output coupling structures can also be used in the HMD, as described in, for example, Levola, "Diffractive optics for virtual reality displays", Journal of the Society for Information Display, volume 14, issue 5, pages 467-475, May 2006.

An advantage of this embodiment consists of it being possible to use the same first optical substrate 10 for a plurality of different diopter values. Final diopter fitting can be effected by the first and second DOE 21, 22, which are arranged on the side of a back surface 12 of the first optical substrate 10. To this end, provision can be made of a second optical substrate 30, as described with reference to FIG. 1.

Figure 5:
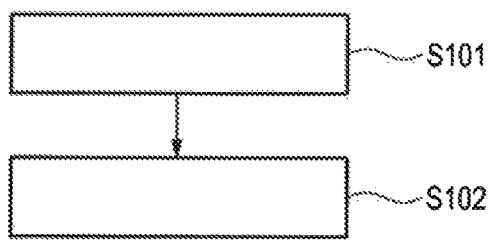
FIG. 5 shows a flowchart of a method for designing an ophthalmological optical element.

FIG. 5 shows a flowchart of a computer-implemented method for designing an ophthalmological optical element 1, in particular a spectacle lens, for a user, wherein the ophthalmological optical element has a first optical substrate, which has a positive or negative first optical power; a first diffractive optical element, which has a second optical power; and a second diffractive optical element, which has a third optical power; wherein the first diffractive optical element and the second diffractive optical element have opposite optical powers and wherein the first diffractive optical element and the second diffractive optical element preferably interact in an at least partly achromatic manner.

In a first step S101, a first optical substrate, which has a positive or negative first optical power, is selected according to a diopter range to be corrected. The selection of the first optical substrate can be made from a set of predetermined first optical substrates, with each of the predetermined optical substrates acting as a basis for a diopter range to be corrected. By way of example, a corrective effect of −3 dpt is required for the user. Consequently, it is possible to select a first optical substrate, which is designed for a diopter range of −4 dpt to 0 dpt to be corrected.

In a second step S102, the first diffractive optical element, which has the second optical power, and the third diffractive optical element, which has the third optical power, are selected.

The first and second diffractive optical element are preferably selected in such a way that an absolute value of the sum of the second optical power of the first diffractive optical element and of the third optical power of the second diffractive optical element divided by an absolute value of the difference between the second optical power and the third optical power is less than 1/10, in particular less than 1/15, in particular less than 1/20.

Figure 6:
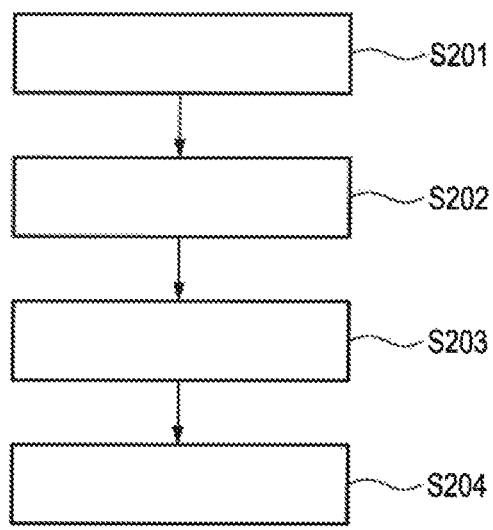
FIG. 6 shows a further flowchart of a method for designing an ophthalmological optical element.

FIG. 6 shows a further flowchart of a method for designing an ophthalmological optical element. Using such a method, it is possible to facilitate a respectively necessary diopter number or, optionally, a specifically optimized refractive error correction from preferably a few, easily producible and optically appealing basic forms of the first optical substrate.

In a first step S201, a diopter range that is to be corrected by a same first refractive optical substrate, also referred to as carrier glass here, is selected, for example from −4 dpt to 0 dpt or from +4 dpt to +7 dpt.

In a second step S202, it is possible to optimize the radius of the front surface 11 and the radius of the back surface 12 of the first refractive optical substrate 10 using conventional methodology for a middling diopter number from this diopter range, for example. Hence, the first optical power of the first refractive optical substrate 10 is set. Preferably, the front surface 11 and the back surface 12 are spherical. An advantage lies in the simple, cost-effective and high quality production.

In a third step S203, a first diffractive optical element (DOE) 21 with a second refractive power and a second diffractive optical element 22 with a third refractive power are provided, wherein, in particular, the following options exist: (a) A DOE is applied on the front surface of the first optical substrate 10 and the other DOE is applied on the back surface of the first optical substrate 10, as shown in FIG. 2, for example. (b) A second optical substrate is provided, wherein a DOE is applied on the front surface of the second optical substrate and the other DOE is applied on the back surface of the second optical substrate, as shown in FIG. 1, for example. (c) It is possible to select a mixed form, wherein a DOE is applied on a front or back surface of the first optical substrate and the other DOE is applied on a front or back surface of the second optical substrate.

Here, the first and second DOE 21, 22 are selected in such a way that they have approximately the same optical power in terms of absolute magnitude, but with a different sign, for the corresponding diopter requirements. As described at the outset, the resultant optical power of the ophthalmological optical element 1 emerges in particular from the sum of the first, second and third optical power.

In a fourth step S204, a simultaneous optimization for a plurality of nodes, i.e., a plurality of desired diopter values, from the diopter range, e.g., −4 dpt to 0 dpt, to be corrected can be implemented, in which the coefficients of the DOEs 21, 22 are optimized together with the predetermined first optical substrate from step S202.

Preferably, the radius of the front surface 11 of the first refractive optical substrate 10 can be kept constant during this optimization, whereas, in particular, the radius of the back surface 12 of the first optical substrate 10 and, where applicable, the radii of the optional second optical substrate 30 and the distances of the DOEs are optimized within allowed boundaries. As a result, an appealing esthetic design can be obtained.

In principle, computer-assisted optimization methods including ray tracing methods are known to a person of average skill in the art. By way of example, it is possible in this case to resort to commercially available products such as Code V or Zemax, for example. However, the choice of the boundary conditions is decisive when using such solutions in order to arrive at an advantageous result.

In particular, in this respect, the inventors have recognized that a small transverse chromatic aberration can be achieved if the first and second diffractive optical element are selected in such a way that an absolute value of the sum of the second optical power of the first diffractive optical element and of the third optical power of the second diffractive optical element divided by an absolute value of the difference between the second optical power and the third optical power is less than $\frac{1}{10}$, in particular less than $\frac{1}{15}$, in particular less than $\frac{1}{20}$.

FIG. 7 to FIG. 13 show exemplary simulation results of ophthalmological optical elements according to aspect of the present disclosure in comparison with conventional spectacle lenses.

FIG. 7 to FIG. 10 show illustrations of a transverse chromatic aberration. The horizontal axis specifies the transverse chromatic aberration µ in millimeters. The vertical axis specifies the visual angle θ of the visual field from 0° to 25°. For improved comparability, the scaling of the axes is identical in FIG. 7 to FIG. 10. Here, the chromatic aberration for long-wavelength light, for example at a wavelength of 643 nm, is represented by a dashed line 71 in each case. A chromatic aberration for short-wavelength light, for example at 480 nm, is represented by the full line 72. A maximum chromatic aberration over the angle range of 0° to 25° is specified by the double-headed arrow 73 in each case.

Figure 7:
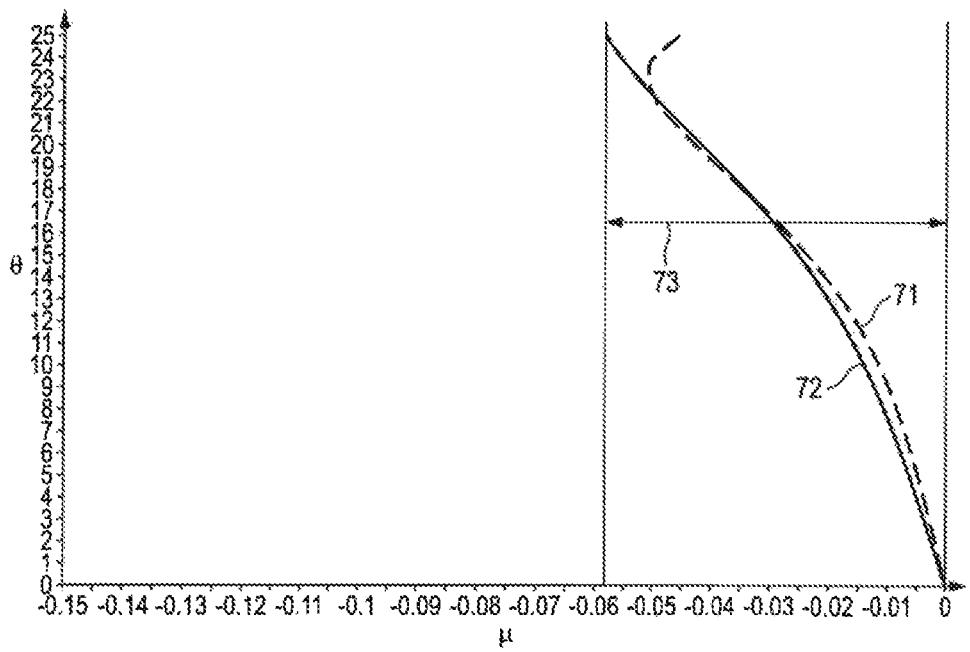
FIG. 7 shows an illustration of a transverse chromatic aberration in an ophthalmological optical element according to an aspect of the present disclosure.
Figure 8:
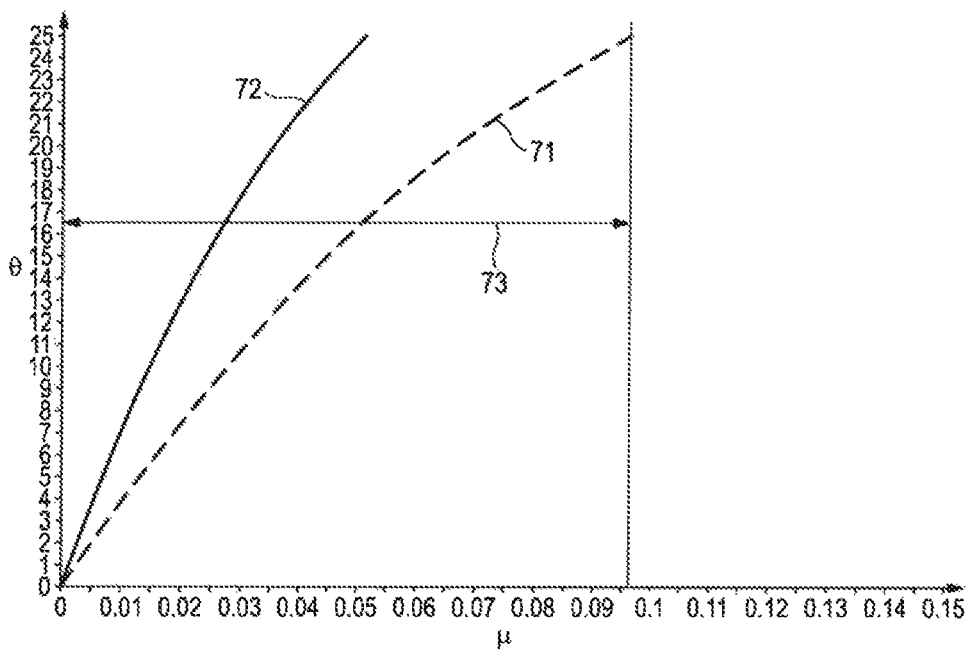
FIG. 8 shows an illustration of a transverse chromatic aberration in the case of a conventional spectacle lens.
Figure 9:
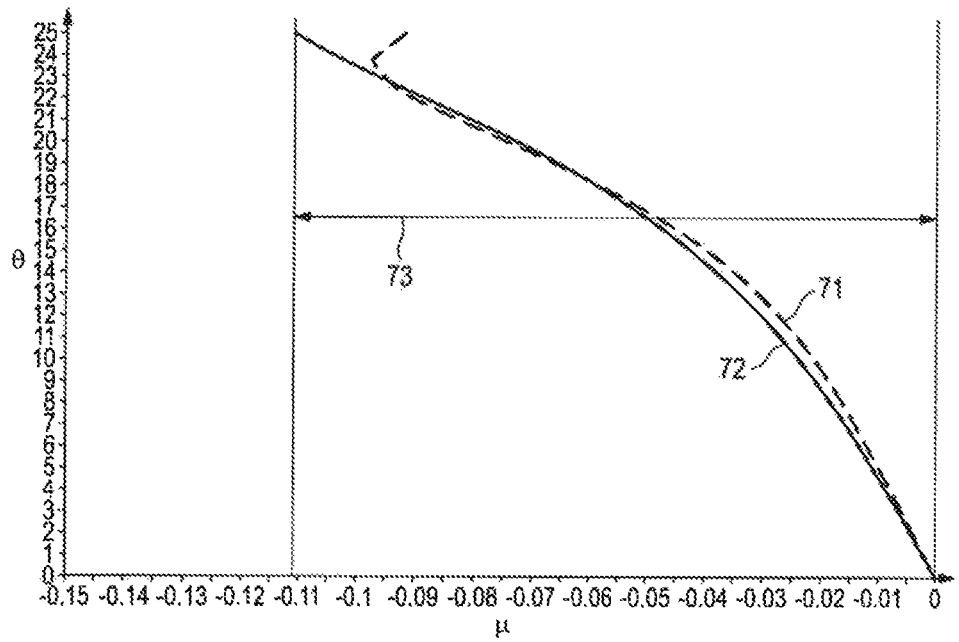
FIG. 9 shows a further illustration of a transverse chromatic aberration in an ophthalmological optical element according to an aspect of the present disclosure.
Figure 10:
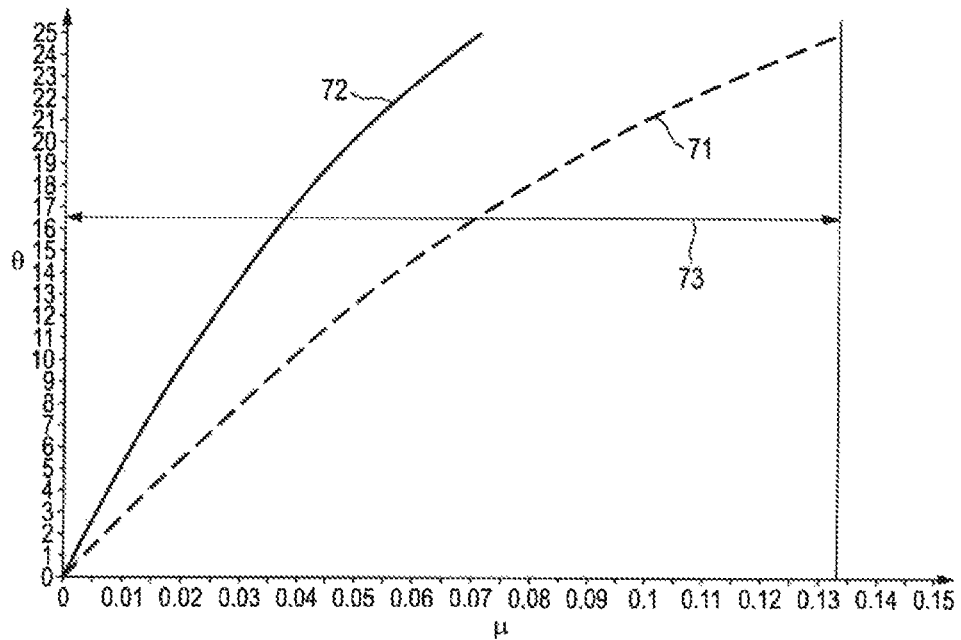
FIG. 10 shows a further illustration of a transverse chromatic aberration in the case of a conventional spherical spectacle lens.

FIG. 7 and FIG. 8 show the transverse chromatic aberration in the case of a dioptric power of +3 dpt. FIG. 9 and FIG. 10 show the transverse chromatic aberration in the case of a dioptric power of +4 dpt.

FIG. 7 and FIG. 9 show an illustration of a transverse chromatic aberration in an ophthalmological optical element according to an aspect of the present disclosure, as illustrated in FIG. 1, for example. FIG. 8 and FIG. 10 show a corresponding illustration of a transverse chromatic aberration for a conventional spherical spectacle lens.

It is clear from the comparison of FIG. 7 with FIG. 8 and the comparison of FIG. 9 with FIG. 10 that the chromatic aberration can be advantageously reduced using the ophthalmological optical element 1 according to an aspect of the present disclosure. In particular, it is consequently possible to achieve a better optical performance, also at the image field edge, using the proposed solution.

Figure 11:
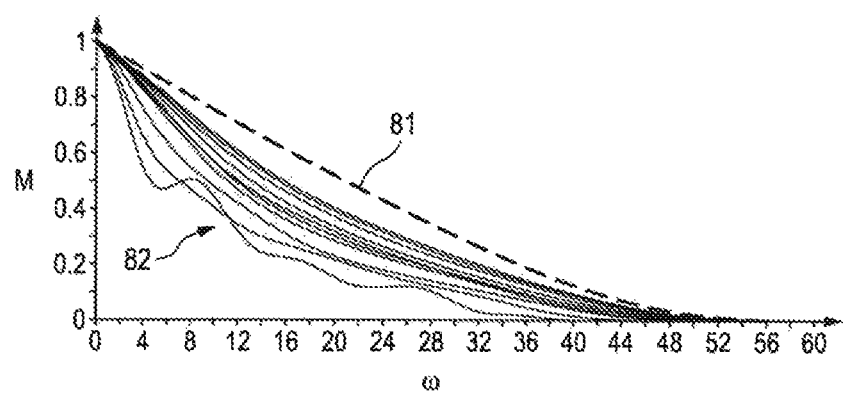
FIG. 11 shows an illustration of an MTF in an ophthalmological optical element according to an aspect of the present disclosure.
Figure 12:
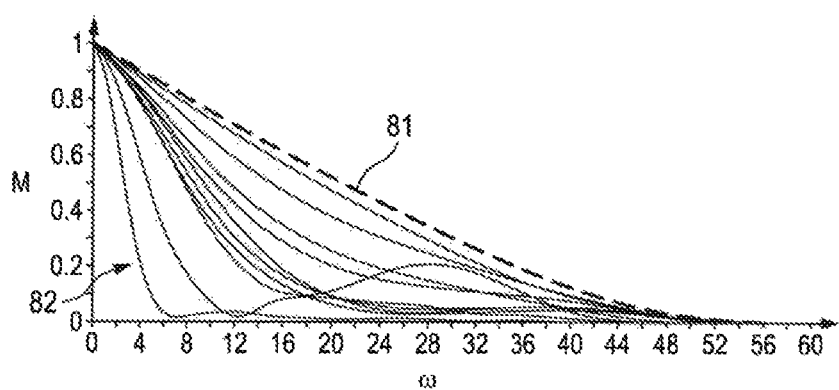
FIG. 12 shows an illustration of an MTF in a conventional spectacle lens having a spherical inner radius.
Figure 13:
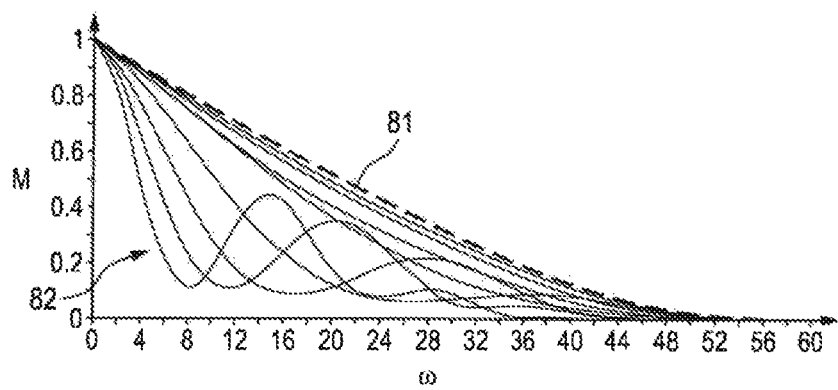
FIG. 13 shows an illustration of an MTF in a conventional spectacle lens having a free-form inner surface.

FIG. 11 to FIG. 13 show images of the modulation transfer function (MTF) in the case of a diopter value of 4 dpt. The horizontal axis specifies the spatial frequency ω in cycles per millimeter. The vertical axis specifies the amplitude of an achievable modulation M.

FIG. 11 shows an MTF for an ophthalmological optical element 1 according to an aspect of the present disclosure, as illustrated in FIG. 1, for example. FIG. 12 shows an MTF for a conventional spherical spectacle lens. FIG. 13 shows an MTF for a conventional spectacle lens with a free-form surface.

In the illustrations, the dashed curve 81 in each case specifies the diffraction-limited maximum of the MTF. The further curves 82 specify the achievable modulation at different visual angles.

By comparing FIG. 11 with FIG. 12 and FIG. 13, it becomes clear that an improved transfer function over conventional spectacle lenses can be achieved over a great visual field by using the ophthalmological optical element 1 according to an aspect of the present disclosure.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An ophthalmic element, in particular a spectacle lens, comprising:
    a first refractive optical substrate, which has a positive or negative first optical power;
    a first diffractive optical element, which has a second optical power; and
    a second diffractive optical element, which has a third optical power,
    wherein the first diffractive optical element and the second diffractive optical element have opposite optical powers, and
    wherein the first diffractive optical element and the second diffractive optical element interact in an at least partly achromatic manner.

2. The ophthalmic element as claimed in claim 1, wherein the first diffractive optical element and the second diffractive optical element interact in an achromatic manner together with the first refractive optical substrate.

3. The ophthalmic element as claimed in claim 1, wherein the absolute value of the sum of the second optical power of the first diffractive optical element and of the third optical power of the second diffractive optical element divided by an absolute value of the difference between the second optical power, and the third optical power is less than $\frac{1}{10}$.

4. The ophthalmic element as claimed in claim 1, wherein the first optical substrate has a front surface and a back surface and wherein at least one of the first diffractive optical element is arranged on the side of the front surface and the second diffractive optical element is arranged on the side of the back surface.

5. The ophthalmic element as claimed in claim 1, comprising a second optical substrate that has at least one of the first diffractive optical element and the second diffractive optical element.

6. The ophthalmic element as claimed in claim 5, wherein the first optical substrate has a front surface and a back surface and wherein the second optical substrate is arranged on the side of the front surface or the back surface of the first optical substrate.

7. The ophthalmic element as claimed in claim 5, wherein the second optical substrate comprises a film, a glass or a plastics shell.

8. The ophthalmic element as claimed in claim 5, wherein a cemented layer or an air gap is arranged between the first optical substrate and the second optical substrate.

9. The ophthalmic element as claimed in claim 1, wherein at least one of the first and second diffractive optical elements is produced by a process including at least one of laser-beam writing, stamping, holographic exposure and photolithography.

10. The ophthalmic element as claimed in claim 1, wherein at least one of the first and second diffractive optical elements is rotationally symmetric with respect to an optical axis.

11. The ophthalmic element as claimed in claim 1, wherein the first and second diffractive optical element are each described by a phase polynomial of a second or higher order in a cross-sectional plane, wherein, with a tolerance range of ±20%, the following relationship applies between a first coefficient $a_{1,DOE1}$ of the phase polynomial of the first diffractive optical element and a first coefficient $a_{1,DOE2}$ of the phase polynomial of the second diffractive optical element:

$$\left|\frac{a_{1,DOE1}}{a_{1,DOE1} + a_{1DOE2}}\right| = \frac{20}{\sqrt{D}\sqrt{d}},$$

wherein D specifies a resultant additional optical power by the first and second diffractive optical element, d specifies a distance between the first and second diffractive optical element and $\lambda_0$ specifies a design wavelength.

12. The ophthalmic element as claimed in claim 1, further comprising at least one of an astigmatic effect and a differently focusing effect in a near and far part.

13. A pair of spectacles comprising a frame, a first spectacle lens and a second spectacle lens, wherein at least one of the first and second spectacle lenses is an ophthalmic element as claimed in claim 1.

14. A head-mounted display apparatus comprising an ophthalmic element as claimed in claim 1, wherein the ophthalmic element further comprises:
an input coupling optical unit that, by means of the first optical substrate of the ophthalmic element, is configured to input couple an image to be displayed.

15. A computer-implemented method for designing an ophthalmic element, in particular a spectacle lens, for a user, wherein the ophthalmic element includes a first optical substrate, which has a positive or negative first optical power; a first diffractive optical element, which has a second optical power; and a second diffractive optical element, which has a third optical power, wherein the first diffractive optical element and the second diffractive optical element have opposite optical powers and wherein the first diffractive optical element and the second diffractive optical element interact in an at least partly achromatic manner, wherein the method includes the following steps:
selecting the first optical substrate, which has a positive or negative first optical power, according to a diopter range to be corrected; and
providing the first diffractive optical element, which has the second optical power, and the second diffractive optical element, which has the third optical power.

16. The method as claimed in claim 15, wherein the first and second diffractive optical element are selected in such a way that an absolute value of the sum of the second optical power of the first diffractive optical element and of the third optical power of the second diffractive optical element divided by an absolute value of the difference between the second optical power and the third optical power is less than 1/10.

17. The method as claimed in claim 15, wherein the first optical substrate is selected from a set of predetermined first optical substrates, wherein each of the predetermined optical substrates acts as a basis for a diopter range to be corrected, the set of predetermined first optical substrates having at least one of the following diopter ranges: 0 . . . +5 dpt, 0 . . . −5 dpt, +5 . . . +8 dpt and −5 . . . 8 dpt.

18. The method as claimed in claim 17, wherein a substrate of the set of predetermined first optical substrates acts as a basis for a diopter range of at least 2.

19. A method for producing an ophthalmic element, in particular a spectacle lens, including the steps of designing the ophthalmic element according to a method as claimed in claim 15, and producing the ophthalmic element.

20. A computer program product comprising program code for carrying out a method as claimed in claim 15 when the computer program product is executed on a data processing system.

* * * * *